US011460866B2

(12) United States Patent
Amsili et al.

(10) Patent No.: US 11,460,866 B2
(45) Date of Patent: Oct. 4, 2022

(54) UAV CARRIER

(71) Applicant: PEARLS OF WISDOM ADVANCED TECHNOLOGIES LTD, Netanya (IL)

(72) Inventors: Shay Amsili, Netanya (IL); Eyal Doron, Netanya (IL)

(73) Assignee: PEARLS OF WISDOM ADVANCED TECHNOLOGIES LTD, Netanya (IL)

( * ) Notice: Subject to any disclaimer, the term of this patent is extended or adjusted under 35 U.S.C. 154(b) by 0 days.

(21) Appl. No.: 17/442,140

(22) PCT Filed: Mar. 23, 2020

(86) PCT No.: PCT/IL2020/050340
§ 371 (c)(1),
(2) Date: Sep. 23, 2021

(87) PCT Pub. No.: WO2020/212966
PCT Pub. Date: Oct. 22, 2020

(65) Prior Publication Data
US 2022/0171410 A1 Jun. 2, 2022

(30) Foreign Application Priority Data

Apr. 18, 2019 (IL) .......................................... 266248
Nov. 21, 2019 (IL) .......................................... 270846

(51) Int. Cl.
*G05D 1/00* (2006.01)
*B64C 39/02* (2006.01)
(Continued)

(52) U.S. Cl.
CPC ............ *G05D 1/101* (2013.01); *B64C 39/022* (2013.01); *B64C 39/024* (2013.01); *B64D 27/24* (2013.01);
(Continued)

(58) Field of Classification Search
CPC ........ G05D 1/101; G05D 1/00; B64C 39/022; B64C 39/024; B64C 2201/027;
(Continued)

(56) References Cited

U.S. PATENT DOCUMENTS 8,965,140 B1* 2/2015 Xu .......................... H04N 19/14
382/273
9,387,928 B1  7/2016 Gentry et al.
(Continued)

FOREIGN PATENT DOCUMENTS

EP  2957978 A1  12/2015
EP  3342715 A1  7/2018
(Continued)

OTHER PUBLICATIONS

B Drone—http://www.dubaidesignweek.ae/global-grad-show/projects/b-drone/on Jul. 8, 2018 at 13:00.
(Continued)

*Primary Examiner* — Yonel Beaulieu

(57) ABSTRACT

A system comprising: an Unmanned Aerial Vehicle (UAV) carrier comprising a power supply, the UAV carrier connected, via respective wires, to one or more UVs, wherein: (a) each of the UVs is capable of performing maneuvers irrespective of maneuvers of the UAV carrier during performance of a mission; and (b) each of the UVs receives at least one of an electrical current from the power supply or digital data from the UAV carrier through the respective wires, during performance of the mission.

13 Claims, 4 Drawing Sheets

(51) Int. Cl.
  *B64D 27/24* (2006.01)
  *B64D 47/08* (2006.01)
  *G06V 20/17* (2022.01)
  *G06T 7/73* (2017.01)
  *B64F 3/02* (2006.01)
  *G05D 1/10* (2006.01)

(52) U.S. Cl.
  CPC ............... *B64D 47/08* (2013.01); *B64F 3/02* (2013.01); *G06T 7/73* (2017.01); *G06V 20/17* (2022.01); *B64C 2201/027* (2013.01); *B64C 2201/042* (2013.01); *B64C 2201/06* (2013.01); *B64C 2201/127* (2013.01); *B64C 2201/141* (2013.01); *B64C 2201/206* (2013.01); *G06T 2207/10032* (2013.01); *G06T 2207/30204* (2013.01)

(58) Field of Classification Search
  CPC ......... B64C 2201/042; B64C 2201/06; B64C 2201/127; B64C 2201/141; B64C 2201/206; B64C 39/001; B64C 39/02; B64D 27/24; B64D 47/08; B64F 3/02; G06T 7/73; G06T 2207/10032; G06T 2207/30204; G06V 20/17
  See application file for complete search history.

(56) References Cited

U.S. PATENT DOCUMENTS

| | | | |
|---|---|---|---|
| 9,758,301 B2 | 9/2017 | Porat | |
| 9,841,757 B2 | 12/2017 | Aguirre | |
| 10,013,886 B2 | 7/2018 | Blomberg | |
| 10,741,088 B1* | 8/2020 | Walker | G08G 5/0013 |
| 2009/0205845 A1 | 8/2009 | Hoffman | |
| 2009/0294573 A1 | 12/2009 | Wilson | |
| 2013/0233964 A1 | 9/2013 | Woodworth | |
| 2015/0041598 A1 | 2/2015 | Nugent | |
| 2016/0062364 A1 | 3/2016 | Foinet et al. | |
| 2016/0179096 A1 | 6/2016 | Bradlow et al. | |
| 2017/0085840 A1 | 3/2017 | Mizushina et al. | |
| 2017/0316701 A1 | 11/2017 | Gil et al. | |
| 2017/0355469 A1 | 12/2017 | Canning | |
| 2017/0361929 A1* | 12/2017 | Demonfort | B64D 5/00 |
| 2018/0061249 A1* | 3/2018 | Cui | G08G 5/0043 |
| 2018/0356841 A1 | 12/2018 | Zilberstein et al. | |
| 2019/0306757 A1* | 10/2019 | Husain | G05D 1/0011 |
| 2022/0171410 A1* | 6/2022 | Amsili | G06V 20/17 |

FOREIGN PATENT DOCUMENTS

| | | | | |
|---|---|---|---|---|
| GB | 2553604 A | 3/2018 | | |
| JP | 2015018932 A | 11/2015 | | |
| KR | 20170019684 A1 | 2/2017 | | |
| KR | 20180031622 B1 | 3/2018 | | |
| KR | 200486515 Y1 | 5/2018 | | |
| WO | WO2014080386 A2 | 5/2014 | | |
| WO | WO-2017090040 A1 * | 6/2017 | | A62C 3/0242 |
| WO | WO2018002775 A1 | 1/2018 | | |
| WO | 2018026754 A1 | 2/2018 | | |
| WO | 2018033925 A1 | 2/2018 | | |
| WO | WO2018051337 A1 | 3/2018 | | |
| WO | WO-2020120601 A1 * | 6/2020 | | |

OTHER PUBLICATIONS

Han, K.S.A., 2017, Test and Evaluation of an Image-Matching Navigation System for a UAS Operating in a GPS-Denied Environment, Specifically look at: Section 3.3.1 (pp. 23-24).

Conte, G. and Doherty, P., 2008, March—An Integrated UAV Navigation System Based on Aerial Image Matching. In Aerospace Conference, 2008 IEEE (pp. 1-10).

* cited by examiner

UAV CARRIER

TECHNICAL FIELD

The invention relates to an Unmanned Aerial Vehicle (UAV) carrier.

BACKGROUND

UAVs are commonly used nowadays to take part or to accomplish various missions or tasks that in the past required manned aircrafts. These missions may include civilian missions, such as: disaster relief, archeology, conservation (pollution monitoring, anti-poaching, etc.), law enforcement, and anti-terrorism missions. These missions may also include commercial missions, such as: aerial surveillance, filmmaking, journalism, scientific research, surveying, cargo transport, and agriculture. These are mere examples and many other relevant missions can be accomplished by an unmanned aircraft.

The UAVs may be fully autonomous in fulfilling their missions, they may be remotely piloted UAVs, controlled by human controllers from afar or they may have partial autonomous capabilities, requiring human intervention in some aspects of their mission.

Due to limitations in the amount of energy and in mission flight time of many UAVs, there is a need to carry at least one UAV to a geographical vicinity of a mission area, thereby eliminating the need for the at least one UAV to fly by consuming its own limited powers to the mission area. There is thus a need for a UAV carrier.

The UAV may rely on Global Positioning System (GPS) signal in order to maneuver to its target. In some cases, using GPS is impractical or impossible, such as: inside buildings, tunnels or other places with no GPS reception or when there are no accurate coordinates of the target or when the UAV has no GPS receiver. There is thus a need for the UAV to navigate without relying on GPS signals (or at least without solely relying thereon) and instead using navigation-enabling information coming from the UAV carrier.

As discussed above, many UAVs are limited in the amount of energy and mission flight time available to them. There is thus a need to elongate the mission time of the individual UAV by relying on energy coming from the UAV carrier.

There is thus a need in the art for a new UAV carrier that will be able to transport at least one UAV to its mission area and to support energy transfer from the UAV carrier to the at least one UAV during its mission.

In some cases, a UAV might need to perform actions on a stationary structure, such as a wall, door, pole (e.g. electrical pole), or on the ground. For example, the UAV may be used to place or pick up and object from the ground, or to clear an obstruction from an electrical overhead wire, or to perform an action on a wall (e.g. clean a window, place a camera), or to place, pick up or move sensors or actuators, as well as retrieve environmental samples, in a hazardous area. Such an action may be very difficult to perform for a large UAV. For example, such a UAV cannot be reliably and safely maneuvered near a wall, due to the risk to collision, and due to the very high degree of precision required of the controlling algorithm controlling the UAV, especially in the presence of own backflow and crosswinds. As for operation near the ground, any UAV hovering less than a few meters above the ground causes a very strong downward flowing air current, which makes precise operation extremely difficult. In addition, for some tasks, such as ground pickup, it is in many cases impossible to land the UAV safely at the desired location.

Various solutions suggest using a physical actuator, such as a robotic arm attached to the UAV, however, this solution has many disadvantages, including, for example:
  The UAV must still maneuver to be in close proximity to the object to which the arm is required to reach, which is a very risky task;
  The UAV must still be controlled to a very high degree of precision and stability;
  A robotic arm is a heavy, complex and expensive device;
  There is a mechanical connection between to manipulated object and the UAV body, which may cause significant back-action. For example, any force used by the manipulator will cause a significant back moment, since it is performed at the end of a long and rigid lever, i.e. the arm itself. This complicates the control and operation of the UAV, and may cause it to lose stability.
  A robotic arm does not solve the problem of operation on objects which lie on the ground, since it necessarily requires the UAV to hover very close to the ground, which is both risky and requires operating within the very strong downwash caused by the UAV itself.

There is therefore a need for a UAV mounted actuation mechanism which allows operation at a distance of a few meters or more from the UAV, and which does not cause a backaction on the UAV body, and which can perform operations, such as placement and pickup, on the ground, and which does not add too much weight and expense to the UAV.

It is to be noted that the terms UAV and drone are used herein interchangeably. It is to be further noted that although reference is made to unmanned aerial vehicles, this is by no means limiting, and the teachings herein can be applied to other types of unmanned vehicles, including non-aerial unmanned vehicles, mutatis mutandis.

References considered to be relevant as background to the presently disclosed subject matter are listed below. Acknowledgement of the references herein is not to be inferred as meaning that these are in any way relevant to the patentability of the presently disclosed subject matter.

US Patent application No. 2009/0205845 (Hoffman) published on Aug. 20, 2009, discloses a method for extinguishing fires includes the steps of loading an unmanned aerial vehicle (UAV) onto a transport aircraft and carrying the UAV to an altitude and location in proximity to a fire area. The UAV is launched from the transport aircraft and guided over the fire area using controllable fixed or deployable aerodynamic structures operably connected to the UAV. Once over the appropriate location, the UAV releases fire extinguishing or retardant material onto the fire or anticipated fire path.

US Patent application No. 2018/0356841 (Zilberstein et al.) published on Dec. 13, 2018, discloses a system and method for deploying a plurality of unmanned aerial vehicles (UAVs) by an airborne carrier aircraft for dispersing payload material, each UAV comprising at least one container containing payload material and being configured to disperse the payload material at a designated dispersion area in an event site.

WIPO Patent application No. 2014/080386 (Almuhairbi et al.) published on Mar. 22, 2018, discloses to provide drones service aero-carrier, a big drone is carrying and supporting two levels of trays, each tray is divided into many compartments, where a loaded mini drone or parcels are to be located. The aero-carrier is connected to the trays from its bottom center via a telescopic shaft, which is welded to the top tray, and penetrating it toward the lower tray, where it is welded to it too. Trays space (gap) adjustment mechanism is provided too, depending on a motor, pulleys, and strings, to pull up the trays with the telescopic shaft to hold the mini drones, or parcels while in flight, or to let the trays move down to expand the gap to the mini drones to be released out while unloading the aero-carrier.

U.S. Pat. No. 10,013,886 (Blomberg et al.) published on Jul. 3, 2018, discloses a method comprising receiving a task set comprising multiple tasks, receiving operational information identifying one or more operating characteristics of multiple drones, and obtaining an initial heuristic ordering of the multiple tasks based on the operational information and the climate information. Each task has a corresponding task location. The method further comprises scheduling the multiple tasks to obtain a final ordering of the multiple tasks. The final ordering represents an order in which the multiple tasks are scheduled, and the final ordering may be different from the initial heuristic ordering.

B DRONE, captured from "http://www.dubaidesignweek.ae/global-grad-show/projects/b-drone/" on Aug. 7, 2018 at 13:00, discloses an earthquake rescue system designed to optimize the first 72 hours of search time. This high-risk period, also known as the 'Golden Time,' is largely responsible for the high mortality rates of both victims and rescue operatives. The B Drone system proposes the use of unmanned aerial drones to carry out these hazardous initial searches. The drone-in-drone system pairs each mother drone with a smaller interior drone, deployed to navigate small gaps and cramped spaces, unreachable or dangerous to the human worker. With real-time GPS, a built-in 4K camera and an infrared heating sensor, the B Drone increases the chances of victim location, while reducing unnecessary risks to rescue workers.

U.S. Pat. No. 9,841,757 (Mikan et al.) published on Dec. 12, 2017, discloses a system for providing drone piggybacking on vehicles is disclosed. In particular, the system may enable drones or other unmanned mobile connected devices to piggyback onto various types of hosts, such as vehicles, in a symbiotic fashion. Through the symbiotic relationship created between the drones and hosts, the drones may utilize the hosts as a means for transport, such as while delivering a good to an intended destination, and the hosts may receive certain incentives in exchange for transporting the drones. Drones may be paired with hosts based on any number of factors, such as whether the host is traveling on a route that corresponds with reaching the intended destination, whether the host is capable of recharging the drone, and whether the drone has sufficient power to reach the intended destination. By enabling drones to piggyback with hosts, the required traveling range for a drone may be reduced.

US Patent application No. 2017/0316701 (Gil et al.) published on Nov. 2, 2017, discloses systems and methods that include UAVs that serve to assist carrier personnel by reducing the physical demands of the transportation and delivery process. A UAV generally includes a UAV chassis including an upper portion, a plurality of propulsion members configured to provide lift to the UAV chassis, and a parcel carrier configured for being selectively coupled to and removed from the UAV chassis. UAV support mechanisms are utilized to load and unload parcel carriers to the UAV chassis, and the UAV lands on and takes off from the UAV support mechanism to deliver parcels to a serviceable point. The UAV includes computing entities that interface with different systems and computing entities to send and receive various types of information.

US Patent application No. 2016/0062364 (Foinet et al.) published on Mar. 3, 2016, discloses a new method of dynamic control of a rotary-wing drone in throw start includes the steps of: a) initializing a predictive-filter altitude estimator; b) the user throwing the drone in the air with the motors turned off; c) detecting the free fall state; d) upon detecting the free fall state, fast start with turn-on of the motors, open-loop activation of the altitude control means, and closed-loop activation of the attitude control means; e) after a motor response time, stabilizing the drone by closed-loop activation of the altitude control means, and closed-loop activation of the attitude control means; f) detecting a stabilization state such that the total angular speed of the drone is lower than a predetermined threshold; and g) upon detecting the stabilization state, switching to a final state in which the drone is in a stable lift condition and pilotable by the user.

US Patent application No. 2016/0179096 (Bradlow et al.) published on Jun. 23, 2016, discloses an unmanned aerial vehicle (UAV) copter for consumer photography or videography can be launched by a user throwing the UAV copter into mid-air. The UAV copter can detect that the UAV copter has been thrown upward while propeller drivers of the UAV copter are inert. In response to detecting that the UAV copter has been thrown upward, the UAV copter can compute power adjustments for propeller drivers of the UAV copter to have the UAV copter reach a predetermined elevation above an operator device. The UAV copter can then supply power to the propeller drivers in accordance with the computed power adjustments.

US Patent application No. 2017/0085840 (Mizushina et al.) published on Mar. 23, 2017, discloses an information gathering apparatus includes an information acquisition sensor unit to acquire information and a propelling system to fly in air. The information gathering apparatus includes a supporting unit and a controller. The supporting unit supports the propelling system in the first and second configurations. The controller moves the supporting unit such that the supporting unit supports the propelling system in the second configuration after the information gathering apparatus is thrown up in a state where the supporting unit supports the propelling system in the first configuration.

European Patent application No. 3342715 (Lee) published on Jul. 4, 2018, discloses a drone according to an embodiment may comprise: a support table; a main unit spaced from the support table and formed above the support table; a connecting portion for connecting the main unit and the support table; and a propulsion unit provided on the outer side of the support table so as to generate thrust. The main unit may have a through-hole formed therein, a parachute may be provided inside the through-hole, and, during a fall, the parachute may be discharged out of the through-hole by deformation of the connecting portion.

US Patent application No. 2017/0355469 (Canning) published on Dec. 14, 2017, discloses a falling drone warning apparatuses and methods are disclosed. The apparatus may be attached to a drone and may measure acceleration during the drone's operation in order to ascertain whether the drone is free falling. If the apparatus detects that the drone is free falling, the apparatus may activate an audible alarm to warn people on the ground of the potential danger and to afford them the opportunity to take action to avoid the drone's impact or minimize its effect.

Han, K. S., 2017. Test and Evaluation of an Image-Matching Navigation System for a UAS Operating in a GPS-Denied Environment. Naval Postgraduate School, Monterey, United States, discloses that Without corrective updates from the Global Positioning System, navigational capabilities are degraded significantly when the inertial navigation system becomes the only source of an unmanned aerial vehicle's movement estimate. Today, unmanned vehicles are easily equipped with a variety of passive sensors, such as video cameras, due to their increasingly lower prices and improvements in sensor resolution. The concept of using an image matching technique on an input video camera stream was demonstrated earlier with real flight data using a single low-grade onboard sensor. This technique works by matching the stream of data from the camera with a pre-stored depository of geo-referenced reference images to estimate the current attitude and position of an unmanned aerial vehicle (UAV). Preliminary results indicated that unfiltered position estimates can be accurate to the order of roughly 100 meters when flying at two kilometers above the surface and unfiltered orientation estimates are accurate to within a few degrees. This thesis examines developed algorithms on a suite of video data, seeking to reduce the errors in estimating attitude and position of a UAV. The data sets collected at King City and Camp Roberts, California, are also studied to discover the effect of altitude, terrain pattern, elevation map, light conditions, age of reference data and other parameters on estimation. This thesis concludes that in the absence of other sources of navigational information, imagery from a camera is a viable option to provide positional information to a UAV.

Conte, G. and Doherty, P., 2008, March. An integrated UAV navigation system based on aerial image matching. In Aerospace Conference, 2008 IEEE (pp. 1-10). IEEE, discloses exploring the possibility of using geo-referenced satellite or aerial images to augment an Unmanned Aerial Vehicle (UAV) navigation system in case of GPS failure. A vision-based navigation system which combines inertial sensors, visual odometer and registration of a UAV on-board video to a given geo-referenced aerial image has been developed and tested on real flight-test data. The experimental results show that it is possible to extract useful position information from aerial imagery even when the UAV is flying at low altitude. It is shown that such information can be used in an automated way to compensate the drift of the UAV state estimation which occurs when only inertial sensors and visual odometer are used.

WIPO Patent application No. 2018051337 (Gabbay et al.) published on Mar. 22, 2018, discloses a portable navigation systems, devices, methods and software for provision of navigation indications to a user in a GPS-denied environment, the system including at least one portable device, including a navigation Application (App) adapted to provide the user with navigational instructions and at least one interface component to provide at least one direction-specific instruction of movement to the user, wherein the App comprises an embedded algorithm adapted to fragment a continuous line course on a map associated with a two or three-dimensional route, the algorithm constructed to provide instructions to the user, responsive to a current position of the device associated with the route, wherein the at least one device is adapted to provide commands from the algorithm to activate the at least one vibrational components, responsive to a position of the device.

WIPO Patent application No. 2018002775 (CALVEZ et al.) published on Jan. 4, 2018, discloses a device for supplying electrical power to a wired system for a drone (1). The device according to the invention includes at least one power converter (4) on the ground and one power converter (2) at the level of the drone (1), regulation at the level of the converter on the ground ensures that the output voltage of the power converter (4) on the ground increases when the output current of the power converter (4) on the ground increases. The method according to the invention is intended for all wired drones, the wire (3) of which is used to supply electrical power to the drone (1).

Korean Patent application No. 20180031622 (HOON) published on Mar. 28, 2018, discloses a drone system, composed of a power from the flying drone and the ground power supply ground. Drone flying and ground power supply device connected to the wire connected to the wire to power. Drone flying includes a first GPS sensor, altitude sensor, a power supply module, the first radio communication unit and a drone controller. The ground power supply device includes a GPS sensor of claim 2, motor, battery ground, the ground communication unit and the ground control unit for rotating the jeonseonril. One end of the wire is connected to the power module of the drone and the other end is connected to the ground battery supplying the power to the ground power supply to the drone. Wires extend from the pulley while winding or jeonseonril. Drone control unit controls the first wireless communication section to transmit the information of the high 1 GPS sensor position information and the elevation of the sensor above the ground power supply. The ground controller controls the ground communication section so as to receive the transmitted location information and the altitude information. Ground control unit using the received location information and the height information to calculate the distance of the drone and the ground power supply. The ground controller controls the rotation of the motor to perform an action in the pool, or winding the wires accommodated in jeonseonril.

Korean Patent No. 200486515 (DOWELS) published on May 31, 2018, discloses a power supply device according to the present invention, the wired cable is connected to the aerial vehicle; and supporting the rotating body, the rotating body; the rotating body consisting of a motor for driving the body; wherein the cable connected to the aircraft during flight phenomena in a drooping to the lower portion; and the deflection sensing whether contact deflection detection unit driven by the motor, which receives a signal control unit for controlling the cable length; There is characterized in that comprises a. According to the present invention, the cable connected to the aerial vehicle, wherein the aerial vehicle is hanging flight deflection in accordance with the lower cable is twisted or trip the obstacle and the vehicle power is not smoothly supplied to the detection unit, including deflection to prevent can adjust the length of the cable.

U.S. Pat. No. 9,387,928 (Gentry et al.) published on Jul. 12, 2016, discloses Systems and methods for providing a series of multiuse UAV docking stations are disclosed. The docking stations can be networked with a central control and a plurality of UAVs. The docking stations can include a number of services to facilitate both UAV guidance and maintenance and community acceptance and benefits. The docking stations can include package handling facilities and can act as a final destination or as a delivery hub. The docking stations can extend the range of UAVs by providing recharging/refueling stations for the UAVs. The docking stations can also include navigational aid to guide the UAVs to the docking stations and to provide routing information from the central control. The docking stations can be incorporated into existing structures such as cell towers, light and power poles, and buildings. The docking stations can also comprise standalone structures to provide additional services to underserved areas.

British Patent application No. 2553604 (Haider) published on Mar. 14, 2018, discloses a drone 601 having stabilizing means to dampen pitch and roll when the drone is in flight, comprising at least one gyroscope 604. Preferably there are two stabilizing gyroscopes located substantially centrally within the frame. There are a number of lift rotors 602 on the drone body 603, providing vertical lift. The drone may also have sideways facing air displacement means, preferably in the form of a plurality of drift rotors 605, and may have adjustable flaps. Preferably the air displacement means comprise four rotors aligned such that two of the rotors are substantially parallel and substantially perpendicular to the other two rotors. The drone preferably has an inductive charging means configured to connect inductively with a remote charging station when the drone is proximate to the charging station, in order to charge a battery on the drone. Preferably the drone has one or more cameras mounted on the shell configured to record or stream video footage. There are independent claims for a drone with inductive charging means, for a drone and storage station with inductive charging means and weather protection means, and for a carrier case for a drone.

European Patent No. 2 003 057 published on Oct. 31, 2012, discloses manipulator arms for accomplishing work in environments in which it may be undesirable to have a human operator perform work. More specifically, the invention relates to manipulator arms used with ducted fan air-vehicles as a means of enabling the use of the manipulator arms in airborne and perched manipulation operations.

US Patent application No. 2009/0050750 (Goossen) published on Feb. 26, 2009, discloses a manipulator arm system on a ducted air-fan UAV is disclosed herein. The target site may be accurately located by the UAV, and the manipulator system may accurately locate the payload at the target site. The manipulator arm may select tools from a toolbox located on-board the UAV to assist in payload placement or the execution of remote operations. The system may handle the delivery of mission payloads, environmental sampling, and sensor placement and repair.

WIPO Patent application No. 2017/184327 (Volpi) published on Oct. 26, 2017 discloses an unmanned aerial robotic vehicle (UARV) that can fly to an object such as a palm tree, hover in place adjacent to the object, mount itself securely and releasably to a mounting location on the object using a mounting mechanism, and which uses an incorporated utility system for performing one or more utilitarian functions, such as use of a cutting tool to trim palm tree branches and foliage.

General Description

In accordance with a first aspect of the presently disclosed subject matter, there is provided a system comprising: at least one Unmanned Aerial Vehicle (UAV); and a UAV carrier configured to carry the at least one UAV from an origin to a destination; wherein the UAV carrier comprises: one or more first cameras; and a first controller configured to: operate the first cameras to capture at least one image of a mission area; identify, on the image, for the at least one UAV, a respective UAV target, being indicative of a destination of the respective UAV; and send to each of the at least one UAV, respective target identification information, based on the image and on the respective UAV target; wherein the at least one given UAV comprises: one or more motors; one or more second cameras; and a second controller configured to: (a) receive the respective target identification information; (b) operate the second cameras to capture navigation images of a sub portion of the mission area; (c) analyze the respective target identification information and the navigation images to determine a spatial disposition of the given UAV from the respective UAV target; (d) operate one or more of the motors to direct the given UAV to the respective UAV target based on the results of the analysis.

In some cases, the second controller is further configured to repeat steps (b) to (d) continuously, until the given UAV reaches the respective UAV target.

In some cases, the target identification information is a marked image, being the image with a marking of the respective UAV target.

In some cases, the target identification information is an encoding based on analysis of the image and of the respective UAV target.

In some cases, for the at least one given UAV: the identify includes identifying, on the image, a plurality of respective UAV targets; the respective target identification information is based on the image and on the plurality of UAV targets; the first controller is further configured to send to the given UAV an order of execution indicative of the order at which the given UAV is required to fly to the plurality of the respective UAV targets; and wherein the second controller is configured to perform steps (b)-(d) for each of the plurality of the respective UAV targets, according to the order of execution.

In accordance with a second aspect of the presently disclosed subject matter, there is provided a system comprising: an Unmanned Aerial Vehicle (UAV) carrier connected, via respective wires, to at least one UAV, wherein: (a) the UAV is capable of performing maneuvers irrespective of maneuvers of the UAV carrier during performance of a mission; and (b) the UAV receives at least one of an electrical current or digital data from the UAV carrier through the respective wires, during performance of the mission.

In some cases, the wires are electrical charging wires for charging a battery of the UAV.

In some cases, a maximal flight time of the UAV that receives the electrical current from the UAV carrier is longer than a second maximal flight time of the UAV operating without receiving the electrical current from the UAV carrier.

In some cases, the wires are power supply wires capable of supplying power to operate the UAV wherein the UAV does not have an alternative power supply source.

In accordance with a third aspect of the presently disclosed subject matter, there is provided a method comprising: carrying, by an Unmanned Aerial Vehicle (UAV) carrier, at least one UAV from an origin to a destination; operating, by a first controller of the UAV carrier, one or more first cameras, to capture at least one image of a mission area; identifying, on the image, for the at least one UAV, a respective UAV target, being indicative of a destination of the respective UAV; and sending to the at least one UAV, respective target identification information, based on the image and on the respective UAV target; wherein the at least one UAV performs the following: (a) receiving, by a second controller of the UAV, the respective target identification information; (b) operating, by the second controller, one or more second cameras of the respective UAV, to capture navigation images of a sub portion of the mission area; (c) analyzing, by the second controller, the respective target identification information and the navigation images to determine a spatial disposition of the UAV from the respective UAV target; (d) operating, by the second controller, one or more of motors of the respective UAV to direct the respective UAV to the respective UAV target based on the results of the analysis.

In some cases, the method further includes: repeating, by the second controller, steps (b) to (d) continuously, until the respective UAV reaches the respective UAV target.

In some cases, the target identification information is a marked image, being the image with a marking of the respective UAV target.

In some cases, the target identification information is an encoding based on analysis of the image and of the respective UAV target.

In some cases, the identifying includes identifying, on the image, a plurality of respective UAV targets; the respective target identification information is based on the image and on the plurality of UAV targets; sending, by the first controller, to the respective UAV an order of execution indicative of the order at which the respective UAV is required to fly to the plurality of the respective UAV targets; and wherein performing, by the second controller, steps (b)-(d) for each of the plurality of the respective UAV targets, is in accordance to the order of execution.

In accordance with a fourth aspect of the presently disclosed subject matter, there is provided a method comprising: (a) performing maneuvers, by at least one Unmanned Aerial Vehicle (UAV) that is connected, via respective wires, to a UAV carrier, irrespective of maneuvers of the UAV carrier during performance of a mission; and (b) receiving, by the at least one UAV, at least one of an electrical current or digital data from the UAV carrier through the respective wires, during performance of the mission.

In some cases, the wires are electrical charging wires for charging a battery of the UAV.

In some cases, a maximal flight time of the at least one UAV that receives the electrical current from the UAV carrier is longer than a second maximal flight time of the at least one UAV operating without receiving the electrical current from the UAV carrier.

In some cases, the wires are power supply wires capable of supplying power to operate the at least one UAV wherein the at least one UAV does not have an alternative power supply source.

In accordance with a fifth aspect of the presently disclosed subject matter, there is provided a non-transitory computer readable storage medium having computer readable program code embodied therewith, the computer readable program code, executable by at least one processor of a computer to perform a method of: carrying, by an Unmanned Aerial Vehicle (UAV) carrier, at least one UAV from an origin to a destination; operating, by a first controller of the UAV carrier, at least one first camera, to capture at least one image of a mission area; identifying, on the image, for the at least one UAV, a respective UAV target, being indicative of a destination of the respective UAV; and sending to the at least one UAV, respective target identification information, based on the image and on the respective UAV target; wherein the at least one UAV performs the following: (a) receiving, by a second controller of the respective UAV, the respective target identification information; (b) operating, by the second controller, at least one second camera of the respective UAV, to capture navigation images of a sub portion of the mission area; (c) analyzing, by the second controller, the respective target identification information and the navigation images to determine a spatial disposition of the respective UAV from the respective UAV target; (d) operating, by the second controller, one or more of motors of the respective UAV to direct the respective UAV to the respective UAV target based on the results of the analysis.

In accordance with a sixth aspect of the presently disclosed subject matter, there is provided a non-transitory computer readable storage medium having computer readable program code embodied therewith, the computer readable program code, executable by at least one processor of a computer to perform a method of: (a) performing maneuvers, by at least one Unmanned Aerial Vehicle (UAV) that are connected, via respective wires, to a UAV carrier, irrespective of maneuvers of the UAV carrier during performance of a mission; and (b) receiving, by the at least one UAV, at least one of an electrical current or digital data from the UAV carrier through the respective wires, during performance of the mission.

In accordance with a seventh aspect of the presently disclosed subject matter, there is provided a system comprising: an Unmanned Aerial Vehicle (UAV) carrier connected, via respective wires, to one or more UVs, wherein: (a) each of the UVs is capable of performing maneuvers irrespective of maneuvers of the UAV carrier during performance of a mission; and (b) each of the UVs receives at least one of an electrical current or digital data from the UAV carrier through the respective wires, during performance of the mission.

In some cases, the wires are electrical charging wires for charging a battery of the UV.

In some cases, a maximal flight time of each of the UVs that receives the electrical current from the UAV carrier is longer than a second maximal flight time of the respective UVs operating without receiving the electrical current from the UAV carrier.

In some cases, the wires are power supply wires capable of supplying power to operate the UVs wherein the UVs do not have an alternative power supply source.

In some cases, each given UV of the UVs comprises one or more cameras and a controller configured to: (a) operate the cameras to capture at least one image of a mission area; (b) identify, within the image, a UV target being indicative of a destination of the given UV; (c) control maneuvering means of the given UV for navigating the given UV to the respective UV target; and (d) repeat steps (a)-(c) until the given UVs reach the respective UV target.

In some cases, the UAV carrier comprises one or more cameras and a controller configured to: (a) operate the cameras to capture at least one image of a mission area; (b) identify, within the image, at least one of the UVs giving rise to identified UVs and, for each of the identified UVs, a respective UV target being indicative of a destination of the respective identified UV; (c) control maneuvering means of each of the identified UVs for navigating each of the identified UVs to the respective UV target; and (d) repeat steps (a)-(c) until the identified UVs reach the respective UV targets.

In some cases, (A) the UAV carrier comprises: one or more first cameras; and a first controller configured to: operate the first cameras to capture at least one image of a mission area; identify, within the image, for at least one of the UVs, a respective UV target, being indicative of a destination of the respective UV; and send to the at least one UV, respective target identification information, based on the image and on the respective UV target; and (B) each given UV of the UVs comprising: one or more motors; one or more second cameras; and a second controller configured to: (a) receive the respective target identification information; (b) operate the second cameras to capture navigation images of a sub portion of the mission area; (c) analyze the respective target identification information and the navigation images to determine a spatial disposition of the given UV from the respective UV target; and (d) operate one or more of the motors to direct the given UV to the respective UV target based on the results of the analysis.

In some cases, the second controller is further configured to repeat steps (b) to (d) continuously, until the given UV reaches the respective UV target.

In some cases, the target identification information is a marked image, being the image with a marking of the respective UV target.

In some cases, the target identification information is an encoding based on analysis of the image and of the respective UV target.

In some cases, the identify includes identifying, on the image, a plurality of respective UV targets; the respective target identification information is based on the image and on the plurality of UV targets; the first controller is further configured to send to the given UV an order of execution indicative of the order at which the given UV is required to fly to the plurality of the respective UV targets; and wherein the second controller is configured to perform steps (b)-(d) for each of the plurality of the respective UV targets, according to the order of execution.

In some cases, at least one of the UVs comprises an object placing or retrieving device.

In some cases, the object placing or retrieving device is a general-purpose gripper.

In some cases, the UAV carrier comprises a wire reeling device capable of reeling the wires, thereby retrieving the respective UVs back to the carrier UAV.

In some cases, at least one the UVs is a UAVs.

In some cases, at least one the UVs is an Unmanned Ground Vehicle (UGV).

In accordance with an eighth aspect of the presently disclosed subject matter, there is provided a method comprising: (a) performing maneuvers, by one or more Unmanned Vehicles (UVs) that are connected, via respective wires, to a UAV carrier, irrespective of maneuvers of the UAV carrier, during performance of a mission; and (b) receiving, by at least one of the UVs, at least one of an electrical current or digital data from the UAV carrier through the respective wire, during performance of the mission.

In some cases, the wires are electrical charging wires for charging a battery of the respective UVs.

In some cases, a maximal flight time of the each of the UVs that receive the electrical current from the UAV carrier is longer than a second maximal flight time of the respective UVs operating without receiving the electrical current from the UAV carrier.

In some cases, the wires are power supply wires capable of supplying power to operate the UVs wherein the UVs do not have an alternative power supply source.

In some cases, the method further comprises, by each given UV of the UVs: (a) operating, by the given UV, one or more cameras comprised within the given UV to capture at least one image of a mission area; (b) identifying, within the image, a UV target being indicative of a destination of the given UV; (c) controlling maneuvering means of the given UV for navigating the given UV to the respective UV target; and (d) repeating steps (a)-(c) until the given UVs reach the respective UV target.

In some cases, the method further comprises: (a) operating, by a controller of the UAV carrier, one or more cameras comprised within the UAV carrier to capture at least one image of a mission area; (b) identifying, by the controller, within the image, at least one of the UVs giving rise to identified UVs and, for each of the identified UVs, a respective UV target being indicative of a destination of the respective identified UV; (c) controlling, by the controlled, maneuvering means of each of the identified UVs for navigating each of the identified UVs to the respective UV target; and (d) repeating steps (a)-(c) until the identified UVs reach the respective UV targets.

In some cases, the UAV carrier comprises one or more first cameras and a first controller, and wherein each given UV of the UVs comprises one or more motors, one or more second cameras, and a second controller, the method further comprising: (a) operating the first cameras by the first controller to capture at least one image of a mission area; (b) identifying, by the first controller, within the image, for at least one of the UVs being operating UVs, a respective UV target, being indicative of a destination of the respective UV; and (c) sending, by the first controller, to each of the operating UVs, respective target identification information, based on the image and on the respective UV target; and (d) receiving, by the second controller of each of the operating UVs the respective target identification information; (e) operating, by the second controller of each operating UV, the second cameras to capture navigation images of a respective sub portion of the mission area; (f) analyzing, by the second controller of each operating UV, the respective target identification information and the navigation images to determine a spatial disposition of the respective operating UV from the respective UV target; and (g) operating, by the second controller of each operating UV, one or more of the motors of the respective operating UV to direct the respective operating UV to the respective UV target based on the results of the analysis.

In some cases, the method further comprises repeating steps (e) to (g) the by the second controller of each operating UV continuously, until the respective operating UV reaches the respective UV target.

In some cases, the target identification information is a marked image, being the image with a marking of the respective UV target.

In some cases, the target identification information is an encoding based on analysis of the image and of the respective UV target.

In some cases, the identify includes identifying, on the image, a plurality of respective UV targets; the respective target identification information is based on the image and on the plurality of UV targets; and wherein the method further comprises: sending, by the first controller, to each of the operating UVs an order of execution indicative of the order at which the respective operating UV is required to fly to the plurality of the respective UV targets; and performing by the second controller of each operating UV, steps (e)-(g) for each of the plurality of the respective UV targets, according to the order of execution.

In some cases, at least one of the UVs comprises an object placing or retrieving device.

In some cases, the object placing or retrieving device is a general-purpose gripper.

In some cases, the UAV carrier comprises a wire reeling device capable of reeling the wires, thereby retrieving the respective UVs back to the carrier UAV.

In some cases, at least one the UVs is a UAVs.

In some cases, at least one the UVs is an Unmanned Ground Vehicle (UGV).

In accordance with a ninth aspect of the presently disclosed subject matter, there is provided a non-transitory computer readable storage medium having computer readable program code embodied therewith, the computer readable program code, executable by at least one processor of a computer to perform a method of: (a) performing maneuvers, by at least one Unmanned Aerial Vehicle (UAV) that are connected, via respective wires, to a UAV carrier, irrespective of maneuvers of the UAV carrier during performance of a mission; and (b) receiving, by the at least one UAV, at least one of an electrical current or digital data from the UAV carrier through the respective wires, during performance of the mission.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
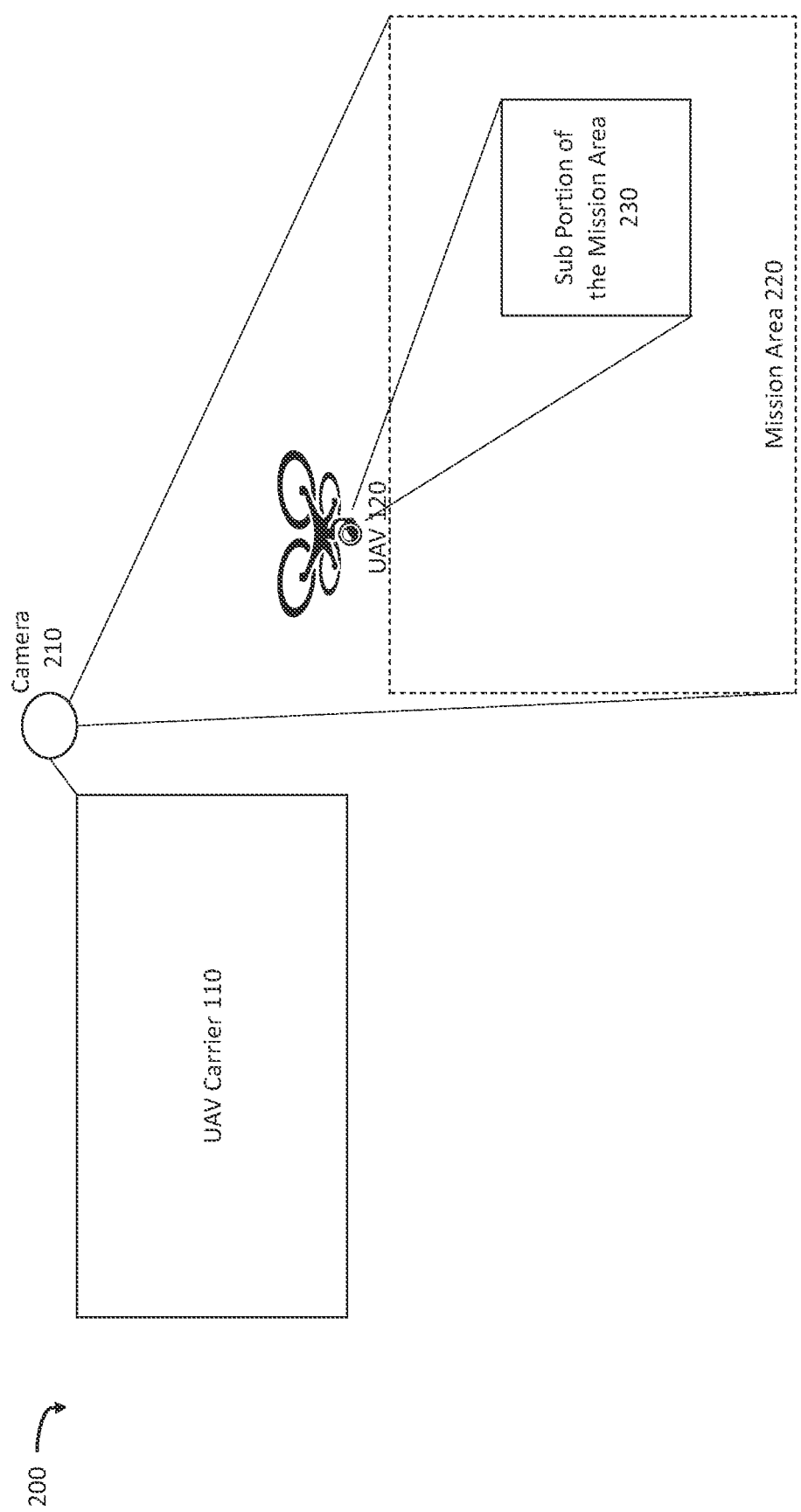
FIG. 1 is a schematic illustration of at least one UAV navigating utilizing information from a UAV carrier, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "activating", "controlling", "operating", "analyzing", "preforming", "releasing", "receiving", "fulfilling", "identifying", "sending", "receiving" or the like, include action and/or processes of a computer that manipulate and/or transform data into other data, said data represented as physical quantities, e.g. such as electronic quantities, and/or said data representing the physical objects. The terms "computer", "processor", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
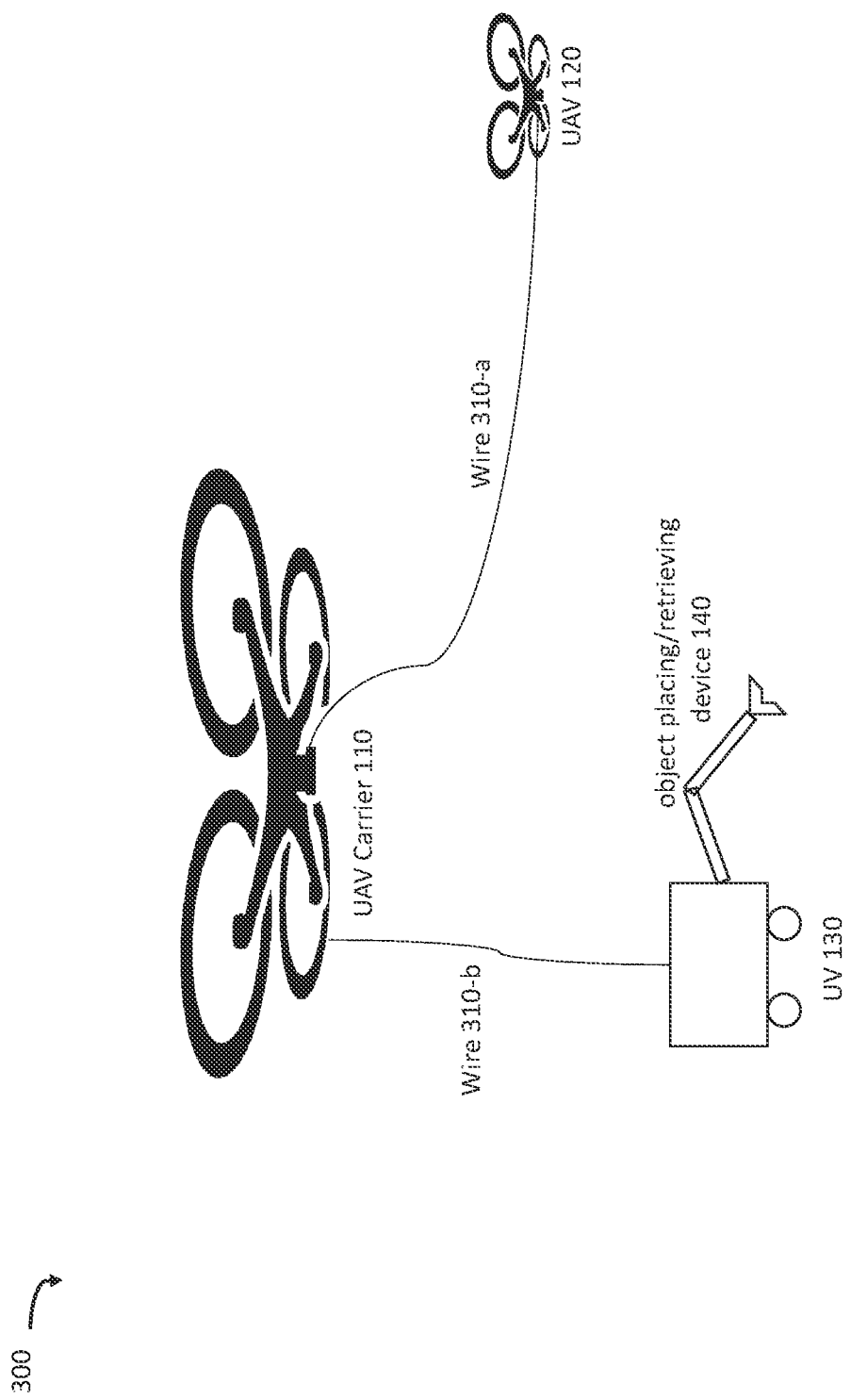
FIG. 2 is a schematic illustration of at least one UV maneuvering while wired to a UAV carrier, in accordance with the presently disclosed subject matter.
Figure 3:
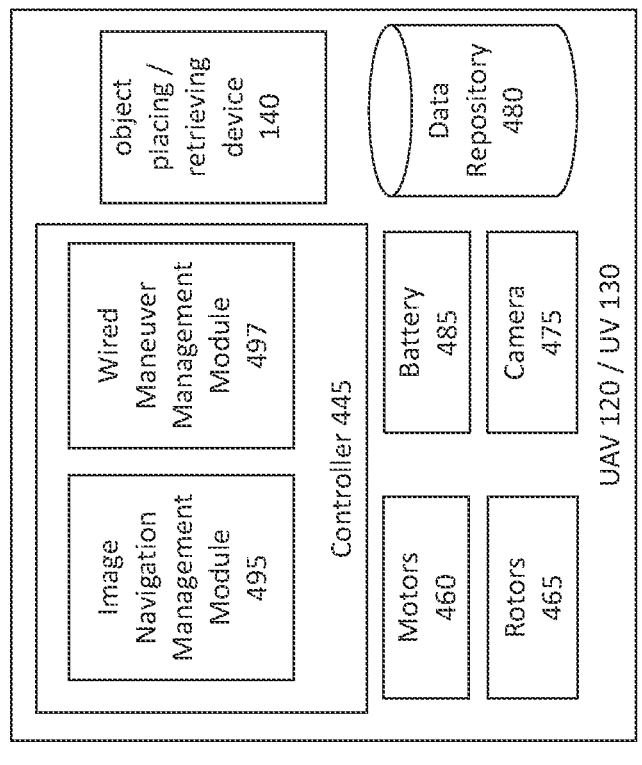
FIG. 3 is a block diagram schematically illustrating one example of a system for a UAV carrier, in accordance with the presently disclosed subject matter.
Figure 3:
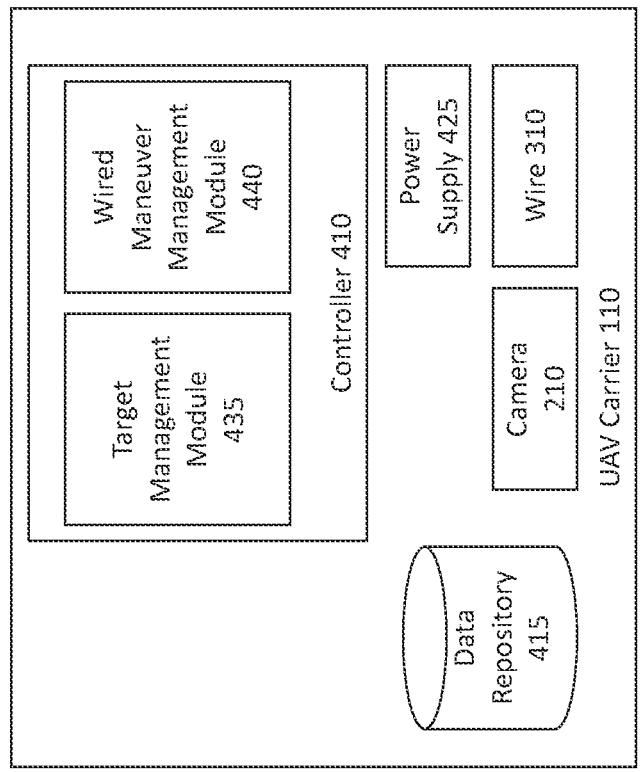
Figure 4:
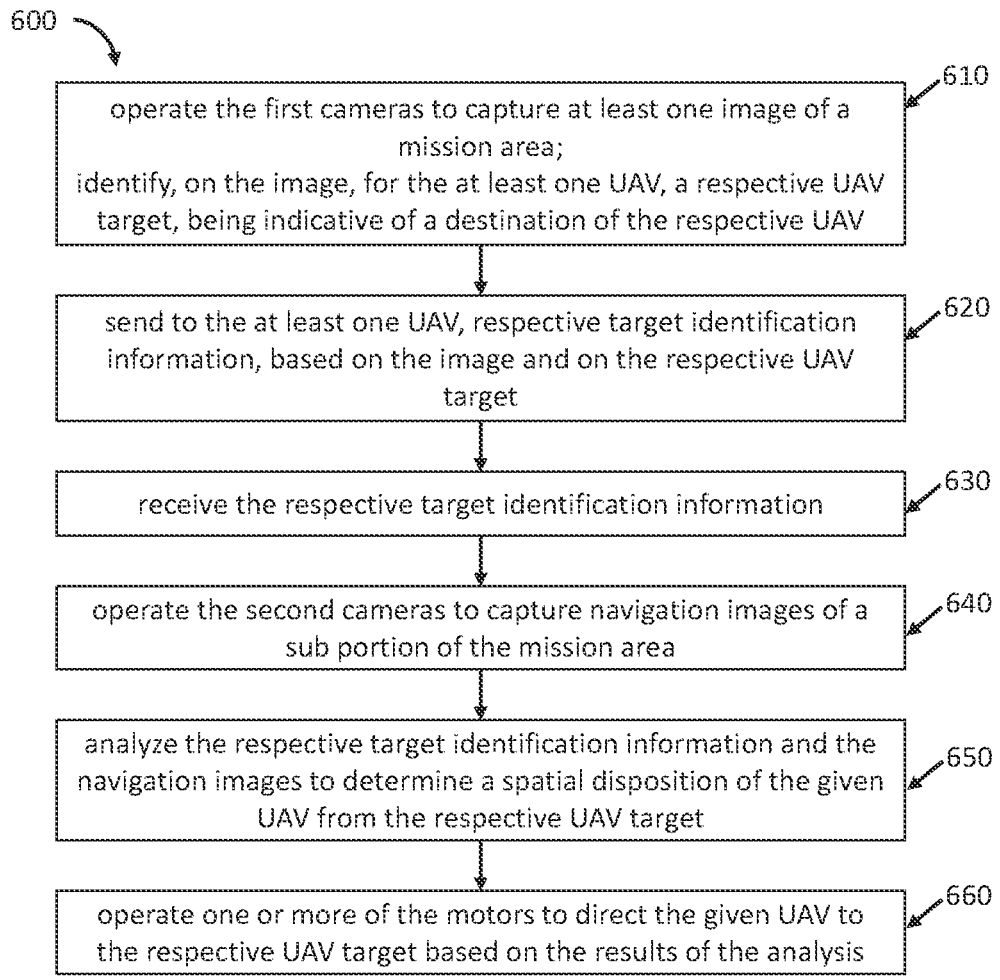
FIG. 4 is a flowchart illustrating one example of a sequence of operations carried out for navigating utilizing information from a UAV carrier, in accordance with the presently disclosed subject matter.
Figure 5:
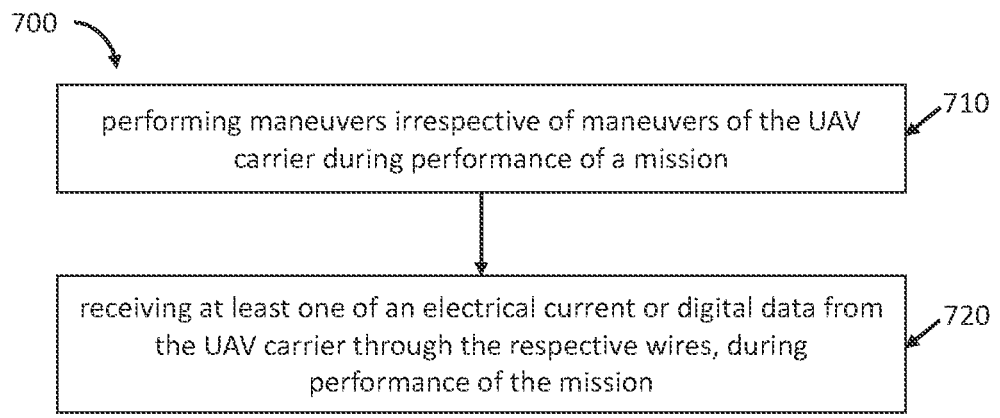
FIG. 5 is a flowchart illustrating one example of a sequence of operations carried out for maneuvering a UV wired to a UAV carrier, in accordance with the presently disclosed subject matter.

In embodiments of the presently disclosed subject matter, fewer, more and/or different stages than those shown in FIGS. 4-5 may be executed. In embodiments of the presently disclosed subject matter one or more stages illustrated in FIGS. 4-5 may be executed in a different order and/or one or more groups of stages may be executed simultaneously. FIGS. 1-3 illustrate a general schematic of the system architecture in accordance with an embodiment of the presently disclosed subject matter. Each module in FIGS. 1-3 can be made up of any combination of software, hardware and/or firmware that performs the functions as defined and explained herein. The modules in FIGS. 1-3 may be centralized in one location or dispersed over more than one location. In other embodiments of the presently disclosed subject matter, the system may comprise fewer, more, and/or different modules than those shown in FIGS. 1-3.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 1, a schematic illustration of at least one UAV navigating utilizing information from a UAV carrier, in accordance with the presently disclosed subject matter.

According to the presently disclosed subject matter, environment 200, includes a UAV carrier 110. UAV carrier 110 can be any vehicle. UAV carrier 110 can be a wheeled vehicle (e.g. a car, a truck, etc.), a tracked vehicle (e.g. a tractor, an armored tracked vehicle, a tank, etc.), a watercraft (e.g. a boat, a hovercraft, a submarine, etc.) or an aerial vehicle (e.g. a drone, a plane, a helicopter, a quadcopter, a balloon, etc.) or any other type of vehicle.

Environment 200 further includes at least one UAV 120. UAV 120 can be fixed-wing air vehicle, a vertical take-off and landing air vehicle, a helicopter, a quadcopter, a drone or any other type of unmanned air vehicle. UAV 120 is commonly used nowadays to take part or to accomplish various missions or tasks that in the past required a manned aircraft. It is to be noted that although reference is made herein to an unmanned aerial vehicle, the unmanned vehicle can alternatively be an unmanned land vehicle or an unmanned watercraft, mutatis mutandis. Accordingly, when reference is made to UAV 120 it encompasses also an unmanned ground/nautical vehicle.

Environment 200 further includes a mission area 220, where UAV 120 has one or more targets where it is to accomplish its missions (e.g. a certain object the UAV 120 needs to get closer to, a certain geographical area the UAV 120 needs to hover above, etc.). In some cases, UAV 120 can be flown/driven or otherwise moved to the mission area 220 by utilizing its own power. For example, UAV 120 may be stored in a central location when not in use and fly/drive/move by utilizing its own power from the central location to the mission area 220. In other cases, UAV 120 can be transported to the mission area by a transport vehicle. For example, a truck may be loaded with UAV 120 at a central storage location and driven to the vicinity of the mission area 220. There the UAV 120 may be unloaded from the truck, activate its motors and fly/drive/move to start fulfilling its missions in the nearby mission area 220. In yet other cases, UAV carrier 110 can be used to carry and transport the UAV 120 to the vicinity of the mission area 220. It is to be noted, that UAV 120 is not necessarily carried to the mission area 220 by UAV carrier 110.

A non-limiting example, for such a mission may be a disaster relief mission, wherein the mission area 220 is the area hit by the disaster (e.g. an earthquake, a fire, a flood, etc.). UAV 120 can be utilized to bring information or to perform other tasks in the mission area 220, without risking human operators. The UAV 120 may be used in this example to fly/drive/move to specific UAV targets within the mission area 220 and perform various missions, such as taking video footage of specific objects within mission area 220.

UAV 120 can be fully autonomous in fulfilling its missions, it can be a remotely piloted/driven UAV 120, controlled by human controllers from afar or UAV 120 can have partial autonomous capabilities, requiring human intervention in some aspects of its mission. In our example, the navigation of the UAV 120 to its targets might be made autonomously, based on image analysis performed by the UAV 120, or the navigation to the target might be made by a human controller controlling UAV 120 from a distant location.

In some cases, UAV carrier 110 can be an unmanned vehicle, such as a UAV. In other cases, the UAV carrier 110 is an aerial vehicle. In these cases, the UAV carrier 110 can be flying or hoovering above a mission area 220 as the UAV 120 is fulfilling its missions. In addition, UAV carrier 110 can be fully autonomous. UAV carrier 110 can be remotely piloted, controlled by a human controller from afar or UAV carrier 110 can have partial autonomous capabilities, requiring human intervention in some aspects of its mission.

UAV carrier 110 can comprise one or more cameras 210. In some cases, each camera 210 can be connected to the UAV carrier's 110 body, e.g. on an outer end of an interface arm extending outwards from the UAV carrier's 110 body. In other cases, cameras 210 can be connected on the outer part of the UAV carrier's 110 body itself. It yet some other cases, cameras 210 can be installed inside an internal part of the UAV carrier's 110 body wherein windows are located on the UAV carrier's 110 body in a way that enables cameras 210 to capture images from outside the UAV carrier 110. Cameras 210 can be installed in a way that they can capture images or video footage of mission area 220.

UAV 120 can rely on GPS signal in order to maneuver to its targets within the mission area 220, but in some cases, depending on GPS is impractical or impossible, such as: inside buildings, tunnels or other places with no GPS reception or when there are no accurate coordinates of the target or when the UAV 120 has no GPS receiver. In these cases, the UAV 120 can navigate to the target by relying on target identification information coming from the UAV carrier 110. This will enable the UAV 120 to reach its target without relying on an internal GPS receiver.

In some cases, the target identification information is a GPS signal. In these cases, the UAV 120 can analyze the GPS signal sent from the UAV carrier 110 in order to navigate to its target within the mission area 220 without the need for an internal GPS receiver.

In other cases, the target identification information are images or video footage of the mission area 220. In other cases, the target identification information is based on the images or video footage of the mission area 220 and can be a combination of one or more of: encoding of the images or video footage, vector information based on the images or video footage, outline of the contour of objects in the images or the video footage or any other information that is based on the images or video footage and can be used by the UAV 120 to identify the location and navigate to its targets. In these cases, the images or video footage may include a UAV target marking, marking a geographical location of a target for at least one UAV 120. The target identification information can be transmitted to the at least one UAV 120. The at least one UAV 120 can operate an internal camera to take one or more images of a sub portion of the mission area 230. The sub portion of the mission area 230 may be the area of mission area 220 where the target is located. The at least one UAV 120 can than navigate to its target by analyzing the target identification information and the one or more images of a sub portion of the mission area 230 to determine a spatial disposition thereof from its respective targets. The analysis may be done for example by image analysis, comparing the target identification information and the images captured by the UAV 120. The at least one UAV 120 can than operate its motors to direct itself to its respective targets, based on the results of the analysis.

In the non-limiting illustrated example in FIG. 1 which continues our previous example, of a disaster relief mission, the UAV carrier 110 can be flying above the mission area 220. The UAV carrier can utilize its camera 210 to take images of the mission area. The UAV carrier 110 can mark a specific target, for example: a window of a damaged building that was damaged in the disaster. A UAV 120 may be hovering above the mission area 220. The UAV 120 can have a mission to take video footage through the window. The video footage can be relayed to a disaster response headquarters and used to decide if and what kind of human assistance is required at the damaged building. In our example the UAV 120 cannot rely on an internal GPS to navigate to the window. The UAV 120 receives marked images or target identification information that is based on the images, for example: a contour of an object in the mission area 220, from the UAV carrier 110 and uses its own camera to take image of a sub portion of the mission area 230. The UAV 120 analyses the marked images and the images it has taken in order to determine the spatial disposition of the UAV 120 with respect to the window. The UAV 120 than activates its motors to maneuver itself to the windows and fulfill its mission.

In some cases, the target of a given UAV 120 may change during the mission, for various reasons. For example: a moving target, new information, more accurate target information. In these cases, the UAV carrier 110 may send updated target identification information, relaying the new geolocation of the target of the given UAV 120 to the given UAV 120. The given UAV 120 may than operate its internal camera to capture one or more images of an additional sub portion of the mission area 230. The given UAV 120 can than navigate to its new target by analyzing the additional target identification information and the one or more images of the additional sub portion of the mission area 230 to determine a spatial disposition from its current location to the respective new targets. The given UAV 120 can than operate its motors to direct itself to its respective new targets, based on the results of the analysis.

Continuing our previous example, the UAV's 120 target may change to another window of the same damaged building, for example: to get a better view of the inside of the damaged building. The UAV carrier 110 can than send UAV 120 updated images of the building, with the other window marked as a target. The UAV 120 can than capture additional pictures of the damaged building, and by analyzing them using image analysis, determine a spatial disposition to the other window, navigate to the other window and complete its mission.

In addition, the target identification information may include more than one target and an order of execution for the UAV 120 for fulfilling its missions within these targets. For example, continuing our previous examples, the target identification information may be an image of the damaged building with markings of a number of windows through which the UAV 120 needs to take footage of the inside of the building. The target identification information will include an order of execution for the UAV 120 to start from a certain window, complete its task and then move to the next window and so on.

It is noted that in some cases the target identification can come from sources other than then camera 210 of the UAV carrier 110. For example, the target identification information can be aerial photographs of the mission area 220 obtained from satellites or other sources. In addition, the target identification information can be obtained in a preliminary stage and not during the mission. For example, aerial photographs of the mission area 220 that were preloaded to the UAV carrier 110 before the start of the mission.

Turning to FIG. 2. FIG. 2 is a schematic illustration of at least one UV maneuvering while wired to a UAV carrier, in accordance with the presently disclosed subject matter.

According to the presently disclosed subject matter, environment 300, includes a UAV carrier 110. UAV carrier 110 might be any vehicle. UAV carrier 110 might be a wheeled vehicle (e.g. a car, a truck, etc.), a tracked vehicle (e.g. a tractor, an armored tracked vehicle, a tank, etc.), a watercraft (e.g. a boat, a hovercraft, a submarine, etc.) or an aerial vehicle (e.g. a drone, a plane, a helicopter, a quadcopter, a balloon, etc.) or any other type of vehicle.

Environment 300 further includes at least one Unmanned Vehicle (UV) such as UAV 120 and UV 130. UAV 120 may be a fixed-wing air vehicle, a vertical take-off and landing air vehicle, a helicopter, a quadcopter, a drone or any other type of unmanned air vehicle. UV 130 may be an unmanned ground vehicle or an unmanned nautical vessel. UVs are commonly used nowadays to take part or to accomplish various missions or tasks that in the past required manned aircrafts.

UV (UAV 120/UV 130) can comprise an object placing/retrieving device 140, such as a gripper, or any other mechanical means for placing objects or retrieving objects at/from the mission area.

UAV carrier 110 may carry and transport at least one UV (UAV 120/UV 130) to a location where its mission is to be fulfilled. When reaching the vicinity of the location of its mission, UV may be released from UAV carrier 110 to fly/drive/move to its mission utilizing its own energy. It is to be noted, that UV is not necessarily carried by UAV carrier 110 to the location of its mission and may alternatively be flying to the location of its mission from a central storage location, by utilizing its own energy.

As discussed above, many UVs are limited in the amount of energy and the mission flight time available to them. There is thus a need to elongate the mission time of the individual UV by relying on energy coming from the UAV carrier 110. This can be achieved by one or more wires (e.g. wire 310-*a*, wire 310-*b*, etc., together referred to herein as wires 310) that connects the UV (UAV 120/UV 130) to the UAV carrier 110 during the mission. Wires 310 may transmit data between UV and UAV carrier 110, thereby saving the need for UV to have a wireless communication module. This can make UV lighter and more energy efficient than another UV that is not wired to UAV carrier 110 and does require a wireless communication module in order to receive and transmit data needed for its mission.

Additionally, or alternatively, wire 310 may be utilized to transfer electrical current from the UAV carrier to the UV (UAV 120/UV 130), thereby enabling the UV to enlengthen its mission time, relaying on energy coming from the UAV carrier 110. It is to be noted that wire 310 may be used to transfer both data and electrical current between UAV carrier 110 and the UV.

A non-limiting example for such a mission may be a disaster relief mission, wherein an area is hit by a disaster (e.g. an earthquake, a fire, a flood, etc.) and the UV (UAV 120/UV 130) is utilized to bring information or to perform other tasks in the disaster hit area, without risking human operators. The UV may be used in this example to fly/drive/move to specific objectives while connected to the UAV carrier with respective wires 310. Each wire 310 can transfer data between the UV and the UAV carrier. The wire 310 can optionally additionally, or alternatively, transfer electrical current from the UAV carrier 110 to the UV.

Attention is drawn to FIG. 3, a block diagram schematically illustrating one example of a UAV carrier, in accordance with the presently disclosed subject matter.

According to certain examples of the presently disclosed subject matter, UAV carrier 110 may be any vehicle that can carry and transport at least one UV (UAV 120/UV 130). UAV carrier 110 might be a wheeled vehicle (e.g. a car, a truck, etc.), a tracked vehicle (e.g. a tractor, an armored tracked vehicle, a tank, etc.), a watercraft (e.g. a boat, a hovercraft, a submarine, etc.) or an aerial vehicle (e.g. a drone, a plane, a helicopter, a quadcopter, a balloon, etc.) or any other type of vehicle. The UAV carrier 110 might be an unmanned vehicle, such as a UAV.

UAV carrier 110 can further comprise one or more cameras 210, each capable of capturing images of the mission area 220.

UAV carrier 110 can further comprise one or more wires 310, each capable of connecting to a respective UV (UAV 120/UV 130) and to supply power to the respective UV and/or charge a battery of the respective UV and/or transfer data between the UAV carrier 110 and the respective UV.

UAV carrier 110 can further comprise a power supply 425, capable of supplying the power needed for the UAV carrier 110 to operate. The power supply 425 may be additionally used to power the UV (UAV 120/UV 130) and/or to charge UV's battery 485 trough wire 310. The power supply 425 may be a battery.

UAV carrier 110 can further comprise, or be otherwise associated with, a data repository 415 (e.g. a database, a storage system, a memory including Read Only Memory—ROM, Random Access Memory—RAM, or any other type of memory, etc.) configured to store data, including inter alia navigational data, missions and targets information related to at least one UV (UAV 120/UV 130), wired maneuvering information, etc. Data repository 415 can be further configured to enable retrieval and/or update and/or deletion of the stored data. It is to be noted that in some cases, data repository 415 can be distributed, while the UAV carrier 110 has access to the information stored thereon, e.g. via a wireless network to which UAV carrier 110 is able to connect to.

UAV carrier 110 further comprises a controller 410. Controller 410 can be one or more processing units (e.g. central processing units), microprocessors, microcontrollers or any other computing devices or modules, including multiple and/or parallel and/or distributed processing units, which are adapted to independently or cooperatively process data for controlling relevant resources of the UAV carrier 110 and for enabling operations related to resources of the UAV carrier 110.

The controller 410 can comprise one or more of the following modules: target management module 435 and wired maneuver management module 440.

According to some examples of the presently disclosed subject matter, target management module 435 can be configured to perform a target management and image navigation process, as further detailed herein, inter alia with respect to FIG. 4. The wired maneuver management module 440 can be configured to perform a wired maneuvering process, as further detailed herein, inter alia with respect to FIG. 5.

According to certain examples of the presently disclosed subject matter, UV (UAV 120/UV 130) can comprise one or more motors 460. When the UV is UAV 120, the motors can be capable of generating a lift for UAV 120. UAV 120 may additionally comprise rotors 465, controlled by said motors 460 to rotate and provide said lift. In other cases, motors 460 are jet motors and can directly create lift for UAV 120. When the UV is UV 130, motors 460 can be capable of generating power to move the UV 130 on the ground or in a nautical environment.

UAV 120 may be a fixed-wing air vehicle, a vertical take-off and landing air vehicle, a helicopter, a quadcopter, a drone or any other type of unmanned air vehicle. UV 130 can be an unmanned ground vehicle, or an unmanned nautical vessel.

UV (UAV 120/UV 130) may be fully autonomous in fulfilling its missions, it may be remotely piloted, or it may have partial autonomous capabilities, requiring human intervention in some aspects of its mission.

UV (UAV 120/UV 130) can further comprise one or more cameras 475, each capable of capturing images of a sub portion of a mission area 230.

UV (UAV 120/UV 130) can comprise an object placing/retrieving device 140, such as a gripper, or any other mechanical means for placing objects or retrieving objects at/from the mission area.

UV (UAV 120/UV 130) can further comprise, or be otherwise associated with, a data repository 480 (e.g. a database, a storage system, a memory including Read Only Memory—ROM, Random Access Memory—RAM, or any other type of memory, etc.) configured to store data, including inter alia navigational data, missions and targets information, wired maneuvering information, etc. Data repository 480 can be further configured to enable retrieval and/or update and/or deletion of the stored data. It is to be noted that in some cases, data repository 480 can be distributed, while the UV has access to the information stored thereon, e.g. via a wireless network to which UV is able to connect to.

UV (UAV 120/UV 130) further comprises a controller 445. Controller 445 can be one or more processing units (e.g. central processing units), microprocessors, microcontrollers or any other computing devices or modules, including multiple and/or parallel and/or distributed processing units, which are adapted to independently or cooperatively process data for controlling relevant resources of the UV and for enabling operations related to resources of the UV.

The controller 445 can comprise one or more of the following modules: image navigation management module 495 and wired maneuver management module 497.

According to some examples of the presently disclosed subject matter, image navigation management module 495 can be configured to perform a target management and image navigation process, as further detailed herein, inter alia with respect to FIG. 4. The wired maneuver management module 497 can be configured to perform a wired maneuvering process, as further detailed herein, inter alia with respect to FIG. 5.

FIG. 4 is a flowchart illustrating one example of a sequence of operations carried out for navigating utilizing information from a UAV carrier, in accordance with the presently disclosed subject matter.

According to certain examples of the presently disclosed subject matter, UAV carrier 110 and UV (UAV 120/UV 130) can be configured to perform a target management and image navigation process 600, e.g. by UAV carrier 110 utilizing the target management module 435 and by UV utilizing the image navigation management module 495.

As detailed above, UV (UAV 120/UV 130) may rely on GPS signal in order to maneuver to its targets within the mission area 220 but in some cases depending on GPS is impractical or impossible. These cases may be: inside buildings, tunnels or other places with no GPS reception or when there are no accurate coordinates of the target or when the UV has no GPS receiver. In these cases, the UV can navigate to the target by relying on target identification information coming from the UAV carrier 110. This will enable the UV to reach its target without relying on an internal GPS receiver or in some cases, without solely relying on the internal GPS. In these cases, navigation can be achieved be a combination of relying on the internal GPS and of relying on the target identification information. It is to be noted that this will allow the UV to be lighter, as it does not require a GPS receiver. This will allow to UV to be more energy efficient and to have longer mission flight time for the same amount of available energy.

For this purpose, controller 410 of UAV carrier 110 can be configured to operate the one or more camera 210 to capture at least one image of a mission area 220 and identify, on the image, for at least one UV (UAV 120/UV 130), a respective UV target, being indicative of a destination of the respective UV (block 610). In some cases, the identification and marking of respective UV targets on the images is done automatically by controller 410. In other cases, a human operator is involved in the process of identifying and marking respective UV targets on the images.

In some cases, camera 210 has a wider angle of the mission area than an angle available to camera 475 of the UV, as UAV carrier 110 can hover higher over the mission area 220 than the altitude of UV as it flies/descends down to fulfill its mission within mission area 220. It is to be noted that in these cases, camera 475 will be able to capture a sub portion of the mission area 230 which is a smaller area, included within the boundaries of mission area 220. In some cases, camera 210 can have larger lenses, better focus, better range or other photographic parameters that are better than those of camera 475.

In the non-limiting illustrated example in FIG. 1, UAV carrier 110 can be hovering high above the disaster area (e.g. higher than the at least one UV (UAV 120/UV 130)). Camera 210 is connected to the body of UAV carrier 110 having a wide angle of mission area 220. UAV carrier 110 captures an image of a damaged building within mission area 220 and identify on the image a specific window which if the target for UV.

After capturing at least one image of the mission area, controller 410 of UAV carrier 110 can be configured to send to the at least one UV, respective target identification information, based on the image and on the respective UV target (block 620).

In some cases, the target identification information may be the image itself along with the marking thereon, and/or an encoding of the image. For example, UAV carrier 110 may analyze the image, identify the contour of the target area and send UV just the contour and a marking of the target. In these cases, the communication between the UAV carrier 110 and UV requires less bandwidth than transmitting the entire image.

Controller 445 of UV can be further configured to receive the respective target identification information (block 630).

It is to be noted, that the sending and receiving of target identification information in blocks 620 and 630 above, can be continues. In some cases, this is due to changes in the missions of UV. For example: a moving target, new information, more accurate target information. The change in the mission may arise from information received from UV.

After receiving the respective target identification information, controller 445 of UV can be further configured to operate the one or more cameras 475 to capture navigation images of a sub portion of the mission area 230 (block 640).

Controller 445 of UV can be further configured to analyze the respective target identification information and the navigation images to determine a spatial disposition of the given UV with respect to the respective UV target (block 650).

Based on the spatial disposition of the given UV with respect to the respective UV target, controller 445 of UV can be configured to operate one or more of the motors 460 to direct the UV to the respective UV target based on the results of the analysis (block 660).

In some cases, UV will be assigned one or more targets. Continuing the non-limiting illustrated example in FIG. 1, at least one UV may be assigned the task of taking video footage of the window of the damaged house within mission area 220.

It is to be noted that, with reference to FIG. 4, some of the blocks can be integrated into a consolidated block or can be broken down to a few blocks and/or other blocks may be added. Furthermore, in some cases, the blocks can be performed in a different order than described herein (for example, block 640 can be performed before block 610, etc.). It is to be further noted that some of the blocks are optional. It should be also noted that whilst the flow diagram is described also with reference to the system elements that realizes them, this is by no means binding, and the blocks can be performed by elements other than those described herein.

FIG. 5 a flowchart illustrating one example of a sequence of operations carried out for preforming maneuvers while wired, in accordance with the presently disclosed subject matter.

According to certain examples of the presently disclosed subject matter, UAV carrier 110 and UV (UAV 120/UV 130) can be configured to perform a wired maneuvering process 700, e.g. by UAV carrier 110 utilizing the wired maneuver management module 440 and by UV utilizing the wired maneuver management module 497.

As detailed above, many UVs are limited in the amount of energy and the mission flight time available to them. In order to elongate the mission time of the individual UV a wire 310 is used to enable UV to rely on power and data coming from the UAV carrier 110. When using a wire to provide power to the UV, the wire can be an electrical charging wire for charging a battery of the UV, or it can be a power supply wire capable of supplying power to operate the UV wherein the UV does not have an alternative power supply source.

In addition, as indicated in the background section, in some cases, a UAV might need to perform actions on a stationary structure, such as a wall, door, pole (e.g. electrical pole), or on the ground. For example, the UAV may be used to place or pick up and object from the ground, or to clear an obstruction from an electrical overhead wire, or to perform an action on a wall (e.g. clean a window, place a camera), or to place, pick up or move sensors or actuators, as well as retrieve environmental samples, in a hazardous area. Such an action may be very difficult to perform for a large UAV. For example, such a UAV cannot be reliably and safely maneuvered near a wall, due to the risk to collision, and due to the very high degree of precision required of the controlling algorithm controlling the UAV, especially in the presence of own backflow and crosswinds. As for operation near the ground, any UAV hovering less than a few meters above the ground causes a very strong downward flowing air current, which makes precise operation extremely difficult. In addition, for some tasks, such as ground pickup, it is in many cases impossible to land the UAV safely at the desired location. Using a UV (UAV 120/UV 130) that is optionally connected to the UAV carrier 110 via a wire 310 can solve these, and other, problems, as such UV's can operate at a distance of a few meters or more from the UAV carrier 110, without being affected by backactions caused by the UAV carrier 110. The UAV carrier 110 can deploy the UVs (UAVs 120/UVs 130) at the mission area and they can perform the required missions at their targets.

As indicated herein, in some cases, the UVs (UAVs 120/UVs 130) can be connected to the UAV carrier 110 via respective wires 310 which can optionally also provide power from the UAV carrier 110 to the UVs and/or enable data communication between UAV carrier 110 and the UVs, as further detailed herein. Using the wires 310 to transfer power and/or to enable data communication enables the UVs to operate without an on-board power source and/or without signal processing hardware and/or without wireless links, thereby saving weight and enabling longer mission times of the UVs. Additionally, using wires 310 can enable relatively easy deployment and retrieval of the UVs from/to the UAV carrier 110 as the wires can be used to control the release of the UVs from the UAV carrier and/or to control the retrieval of the UVs back onto the UAV carrier 110.

In some cases, each UV is configured to take into consideration the position and placement in space of the wires 310 connecting it, and other UVs, to the UAV carrier 110 in order for UV to preform maneuvers without entangling wire 310. It is to be noted, that UAV carrier 110 can also take into consideration the positions and placement in space of the one or more wires 310, connecting the at least one UV to the UAV carrier 110, in order for UAV carrier 110 to perform its maneuvers without entangling the one or more wires 310.

For this purpose, UV can be configured to perform maneuvers irrespective of maneuvers of the UAV carrier 110 during performance of a mission (block 710).

Continuing the non-limiting illustrated example in FIG. 2, UVs (UAVs 120/UVs 130) can be configured to fly/drive/move to their respective targets while connected to the UAV carrier 110 via respective wires 310. When maneuvering, the UVs takes into consideration the position and placement in space of the wires 310, so that the wires 310 will not get entangled with one another. In this example, UAV carrier 110 will also take into consideration the position and placement in space of all wires 310 connecting UV thereto, when maneuvering itself.

Wire 310 may transmit data between UV and UAV carrier 110 (and vice versa), thereby saving the need for UV to have a wireless communication module. This can make UV lighter and more energy efficient than another UV that is not wired to UAV carrier 110 and does require a wireless communication module in order to receive and transmit data needed for its mission.

In some cases, wire 310 may be utilized to transfer electrical current from the power supply 425 of UAV carrier 110 to the respective UV (UAV 120/UV 130), thereby enabling the UV to enlengthen its mission time, relaying on the energy coming from power supply 425. In these cases, the electrical current received by UV through wire 310 may be utilized to charge battery 485.

In other cases, the electrical current received by UV through wire 310 may be utilized to power the UV directly. In these cases, UV may not need battery 485, thus making UV lighter and more energy efficient than another UV that is not wired to UAV carrier 110 and does require a battery 485.

It is to be noted that in some cases, a given UV (UAV 120/UV 130) can be connected to UAV carrier 110 with one or more wires 310. In these cases, each wire 310 can transmit electrical current, digital data or both between the UAV carrier 110 and the given UV.

For this purpose, UV can be configured to receive at least one of an electrical current or digital data from the UAV carrier 110 through the respective wires 310, during performance of the mission (block 720).

In the non-limiting illustrated example in FIG. 2, a given UV (UAV 120/UV 130) receives both data and electrical current through the wire 310, connecting the given UV to the UAV carrier 110, so that the given UV does not require a wireless communication module and does not require a battery 485, thus making UV lighter than a UV that does require those modules.

In some cases, the UVs (UAVs 120/UVs 130) do not need to have fully independent flight capabilities. For example, when use is made of the UVs to enable drop-off/pickup of objects on the ground. In such a case, the UV may be lowered at the end of a wire 310 long enough to enable the drop-off/pickup to occur outside of the downwash of the UAV carrier 110.

In some cases, The UV is required to have a maneuvering capability, independently of the UAV carrier 110, in order to reach a target location from which the desired object is to be picked-up or on which the object is to be dropped-off, noting that the UV does not necessarily need to be able to lift its entire weight, since part of the weight can be borne by the wire 310.

The UV (UAV 120/UV 130) may be controlled by sensors placed on the carrier UAV 110, such as camera 210, or may include its own set of sensors (e.g. camera 475, a LIDAR, a range finder, or any other suitable sensor) for controlling its navigation, as further detailed herein.

In some cases, each UV can navigate itself independently of the UAV carrier. In such cases, each UV comprises one or more cameras 475 and a controller 445 configured to: (a) operate the cameras 475 to capture at least one image of a mission area (e.g. an area in which it is to place an object or from which it is to pick up an object), (b) identify, within the image, a UV target being indicative of a destination of the UV, (c) control maneuvering means of the UV for navigating the UV to the respective UV target (e.g. the place in which the object is to be placed, the place from which the object is to be picked up, or any other target as defined by the mission), and repeat steps (a)-(c) until the UV reaches its respective UV target.

In other cases, the UVs can be controlled by the UAV carrier 110. In such cases, the UAV carrier 110 uses its cameras 210 and its controller 410 to perform the following: (a) operate the cameras 210 to capture at least one image of a mission area, (b) identify, within the image, at least one of the UVs, being identified UVs and, for each of the identified UVs, identify a respective UV target being indicative of a destination of the respective identified UV, (c) control maneuvering means of each of the identified UVs for navigating each of the identified UVs to its respective UV target, and (d) repeat steps (a)-(c) until the identified UVs reach their respective UV targets.

In still other cases, the UVs can be navigated in accordance with the target management and image navigation process 600 described herein with reference to FIG. 4.

It is to be noted that, with reference to FIG. 5, some of the blocks can be integrated into a consolidated block or can be broken down to a few blocks and/or other blocks may be added. Furthermore, in some cases, the blocks can be performed in a different order than described herein (for example, block 720 can be performed before block 710). It is to be further noted that some of the blocks are optional. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A system comprising:
    at least one Unmanned Aerial Vehicle (UAV); and
    a UAV carrier configured to carry the at least one UAV from an origin to a destination;
    wherein the UAV carrier comprises:
        one or more first cameras; and
        a first controller configured to:
            operate the first cameras to capture at least one image of a mission area;
            identify, on the image, for the at least one UAV, a respective UAV target, being indicative of a destination of the respective UAV; and
            send to the at least one UAV, respective target identification information, based on the image and on the respective UAV target;
    wherein the at least one given UAV comprises:
        one or more motors;
        one or more second cameras; and
        a second controller configured to:
            (a) receive the respective target identification information;
            (b) operate the second cameras to capture navigation images of a sub portion of the mission area;
            (c) analyze the respective target identification information and the navigation images to determine a spatial disposition of the given UAV from the respective UAV target; and
            (d) operate one or more of the motors to direct the given UAV to the respective UAV target based on the results of the analysis.

2. The system of claim 1, wherein the second controller is further configured to repeat steps (b) to (d) continuously, until the given UAV reaches the respective UAV target.

3. The system of claim 1, wherein the target identification information is a marked image, being the image with a marking of the respective UAV target.

4. The system of claim 1, wherein the target identification information is an encoding based on analysis of the image and of the respective UAV target.

5. The system of claim 1, wherein for the at least one given UAV:
    the identify includes identifying, on the image, a plurality of respective UAV targets;
    the respective target identification information is based on the image and on the plurality of UAV targets;
    the first controller is further configured to send to the given UAV an order of execution indicative of the order at which the given UAV is required to fly to the plurality of the respective UAV targets;
    and wherein the second controller is configured to perform steps (b)-(d) for each of the plurality of the respective UAV targets, according to the order of execution.

6. A method comprising:
    carrying, by an Unmanned Aerial Vehicle (UAV) carrier, at least one UAV from an origin to a destination;
    operating, by a first controller of the UAV carrier, one or more first cameras, to capture at least one image of a mission area;
    identifying, on the image, for the at least one UAV, a respective UAV target, being indicative of a destination of the respective UAV; and
    sending to the at least one UAV, respective target identification information, based on the image and on the respective UAV target;
    wherein the at least one UAV performs the following:
        (a) receiving, by a second controller of the UAV, the respective target identification information;
        (b) operating, by the second controller, one or more second cameras of the respective UAV, to capture navigation images of a sub portion of the mission area;
        (c) analyzing, by the second controller, the respective target identification information and the navigation images to determine a spatial disposition of the UAV from the respective UAV target; and
        (d) operating, by the second controller, one or more of motors of the respective UAV to direct the respective UAV to the respective UAV target based on the results of the analysis.

7. The method of claim 6, wherein the method further includes: repeating, by the second controller, steps (b) to (d) continuously, until the respective UAV reaches the respective UAV target.

8. The method of claim 6, wherein the target identification information is a marked image, being the image with a marking of the respective UAV target.

9. The method of claim 6, wherein the target identification information is an encoding based on analysis of the image and of the respective UAV target.

10. The method of claim 6, wherein:
    the identifying includes identifying, on the image, a plurality of respective UAV targets;
    the respective target identification information is based on the image and on the plurality of UAV targets;
    sending, by the first controller, to the respective UAV an order of execution indicative of the order at which the respective UAV is required to fly to the plurality of the respective UAV targets;
    and wherein performing, by the second controller, steps (b)-(d) for each of the plurality of the respective UAV targets, is in accordance to the order of execution.

11. A non-transitory computer readable storage medium having computer readable program code embodied therewith, the computer readable program code, executable by at least one processor of a computer to perform a method of:
    carrying, by an Unmanned Aerial Vehicle (UAV) carrier, at least one UAV from an origin to a destination;
    operating, by a first controller of the UAV carrier, at least one first camera, to capture at least one image of a mission area;
    identifying, on the image, for the at least one UAV, a respective UAV target, being indicative of a destination of the respective UAV; and sending to the at least one UAV, respective target identification information, based on the image and on the respective UAV target;

wherein the at least one UAV performs the following:
- (a) receiving, by a second controller of the respective UAV, the respective target identification information;
- (b) operating, by the second controller, at least one second camera of the respective UAV, to capture navigation images of a sub portion of the mission area;
- (c) analyzing, by the second controller, the respective target identification information and the navigation images to determine a spatial disposition of the respective UAV from the respective UAV target; and
- (d) operating, by the second controller, one or more of motors of the respective UAV to direct the respective UAV to the respective UAV target based on the results of the analysis.

12. The system of claim 1, wherein the UAV carrier further comprising a power supply, the UAV carrier connected, via respective wires, to the at least one UAV, and wherein:

- (a) each of the at least one UAV is capable of performing maneuvers irrespective of maneuvers of the UAV carrier during performance of a mission; and
- (b) each of the at least one UAV receives at least one of an electrical current from the power supply or digital data from the UAV carrier through the respective wires, during performance of the mission.

13. The method of claim 6, wherein the UAV carrier further comprising a power supply, the UAV carrier connected, via respective wires, to the at least one UAV, and wherein:

- (a) each of the at least one UAV is capable of performing maneuvers irrespective of maneuvers of the UAV carrier during performance of a mission; and
- (b) each of the at least one UAV receives at least one of an electrical current from the power supply or digital data from the UAV carrier through the respective wires, during performance of the mission.

* * * * *